United States Patent
Ma et al.

(10) Patent No.: US 11,555,928 B2
(45) Date of Patent: Jan. 17, 2023

(54) THREE-DIMENSIONAL OBJECT DETECTION WITH GROUND REMOVAL INTELLIGENCE

(71) Applicant: CYNGN, INC., Menlo Park, CA (US)

(72) Inventors: Biao Ma, Sunnyvale, CA (US); Lior Tal, San Diego, CA (US)

(73) Assignee: CYNGN, INC., Menlo Park, CA (US)

( * ) Notice: Subject to any disclaimer, the term of this patent is extended or adjusted under 35 U.S.C. 154(b) by 0 days.

(21) Appl. No.: 17/808,054

(22) Filed: Jun. 21, 2022

(65) Prior Publication Data
US 2022/0404503 A1    Dec. 22, 2022

Related U.S. Application Data

(60) Provisional application No. 63/366,738, filed on Jun. 21, 2022, provisional application No. 63/213,131, filed on Jun. 21, 2021, provisional application No. 63/213,132, filed on Jun. 21, 2021, provisional application No. 63/213,130, filed on Jun. 21, 2021.

(51) Int. Cl.
*G06K 9/40* (2006.01)
*G01S 17/89* (2020.01)
*G01S 17/931* (2020.01)
*G01S 7/487* (2006.01)

(52) U.S. Cl.
CPC ............ *G01S 17/89* (2013.01); *G01S 7/4876* (2013.01); *G01S 17/931* (2020.01)

(58) Field of Classification Search
CPC ....... G01S 17/89; G01S 7/4876; G01S 17/931
USPC ........................................................ 382/275
See application file for complete search history.

(56) References Cited

U.S. PATENT DOCUMENTS

| | | | |
|---|---|---|---|
| 11,275,965 B2* | 3/2022 | Ku ......................... | G06V 20/56 |
| 2005/0099637 A1 | 5/2005 | Kacyra et al. | |
| 2009/0232355 A1 | 9/2009 | Minear et al. | |
| 2015/0254499 A1 | 9/2015 | Pang et al. | |
| 2019/0138007 A1* | 5/2019 | Baghsorkhi .......... | G05D 1/0278 |

(Continued)

FOREIGN PATENT DOCUMENTS

| | | | | |
|---|---|---|---|---|
| CA | 3090668 A1 * | 8/2019 | ............. | G01S 17/86 |
| EP | 3845927 A1 * | 7/2021 | ............. | G01S 17/10 |

(Continued)

OTHER PUBLICATIONS

PCT International Search Report and Written Opinion issued in corresponding application No. PCT/US2022/034412, dated Oct. 5, 2022.

*Primary Examiner* — Mahendra R Patel
(74) *Attorney, Agent, or Firm* — Maschoff Brennan

(57) ABSTRACT

A method may include obtaining sensor data from one or more LiDAR units and determining a point-cloud corresponding to the sensor data obtained from each respective LiDAR unit. The method may include aggregating the point-clouds as an aggregated point-cloud and generating an initial proposal for a two-dimensional ground model made of multiple grid blocks. The method may include filtering out unrelated raw data points from each grid block of the plurality of grid blocks to generate a filtered point-cloud matrix. The method may include identifying one or more surface-points and one or more object-points included in the filtered point-cloud matrix and generating an array of extracted objects based on the object-points.

19 Claims, 7 Drawing Sheets

(56) References Cited

U.S. PATENT DOCUMENTS

| | | | |
|---|---|---|---|
| 2019/0187253 A1* | 6/2019 | Ghosh | G06N 3/0472 |
| 2019/0265712 A1* | 8/2019 | Satzoda | G08G 1/0133 |
| 2020/0250439 A1* | 8/2020 | Vig | G05D 1/0221 |
| 2020/0333466 A1 | 10/2020 | Hansen et al. | |
| 2020/0363202 A1 | 11/2020 | Metzler et al. | |
| 2020/0363501 A1* | 11/2020 | Lau | G01S 7/4017 |
| 2020/0401816 A1 | 12/2020 | Schroeter | |
| 2021/0026361 A1* | 1/2021 | Ravi | G01S 7/4808 |
| 2021/0149022 A1* | 5/2021 | Kehl | G01S 13/862 |
| 2021/0223373 A1* | 7/2021 | Korobkin | G01S 17/08 |
| 2021/0272304 A1* | 9/2021 | Yang | G06T 7/536 |
| 2022/0111873 A1* | 4/2022 | Wyffels | G06T 7/536 |
| 2022/0164245 A1* | 5/2022 | Lepird | G01S 13/862 |

FOREIGN PATENT DOCUMENTS

| | | | | |
|---|---|---|---|---|
| JP | 6667596 B2 * | 3/2020 | | G01S 13/865 |
| WO | WO-2020205655 A1 * | 10/2020 | | B60W 50/00 |
| WO | WO-2021030376 A1 * | 2/2021 | | G06F 17/153 |
| WO | WO-2021030640 A1 * | 2/2021 | | G06N 3/08 |
| WO | WO-2021086796 A1 * | 5/2021 | | G05D 1/0088 |

* cited by examiner

THREE-DIMENSIONAL OBJECT DETECTION WITH GROUND REMOVAL INTELLIGENCE

CROSS-REFERENCE TO RELATED APPLICATIONS

This application claims the benefit of U.S. Patent Application Ser. No. 63/213,130, filed on Jun. 21, 2021, U.S. Patent Application Ser. No. 63/213,131, filed on Jun. 21, 2021, U.S. Patent Application Ser. No. 63/213,132, filed on Jun. 21, 2021, and U.S. Patent Application Ser. No. 63/366,738, filed on Jun. 21, 2022; the disclosures of which are incorporated herein by reference in their entirety.

FIELD OF THE INVENTION

The present disclosure generally relates to a system and method of three-dimensional object detection with ground removal intelligence.

BACKGROUND

An autonomous vehicle may scan an environment in which the autonomous vehicle is located using one or more sensors positioned on and/or around the autonomous vehicle. The autonomous vehicle may detect objects based on data collected by the sensors and avoid objects in a path of travel of the autonomous vehicle based on the detected objects.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining sensor data from one or more LiDAR units and determining a point-cloud corresponding to the sensor data obtained from each respective LiDAR unit. The method may include aggregating the point-clouds as an aggregated point-cloud and generating an initial proposal for a two-dimensional ground model made of multiple grid blocks. The method may include filtering out unrelated raw data points from each grid block of the plurality of grid blocks to generate a filtered point-cloud matrix. The method may include identifying one or more surface-points and one or more object-points included in the filtered point-cloud matrix and generating an array of extracted objects based on the object-points.

In some embodiments, the method may further comprise identifying one or more objects in which each object is associated with one or more of the object-points and generating an array of extracted objects based on the identified objects.

In some embodiments, each of the grid blocks of the initial proposal for the two-dimensional ground model may include a rectangular shape having edge lengths ranging from 0.5 meters to 10 meters. One or more of the grid blocks of the initial proposal for the two-dimensional ground model further away from an autonomous vehicle corresponding to the LiDAR units may include longer edge lengths than one or more of the grid blocks closer to the autonomous vehicle.

In some embodiments, the unrelated raw data points may include data points that are above a threshold height or are part of an autonomous vehicle to which the LiDAR units are coupled.

In some embodiments, the object-points may be data points included in a given grid block positioned at an elevation higher than a first threshold or lower than a second threshold, where the first threshold and the second threshold are based on other data points included in the given grid block. In these and other embodiments, the surface-points may be data points included in the given grid block that are a remainder of the data points exclusive of the object-points. In these and other embodiments, data points associated with a first change in the elevation for the given grid block that are below a threshold slope may be categorized as surface-points, despite a second change in the elevation across multiple grid blocks being above the threshold slope, the multiple grid blocks including the given grid block.

According to an aspect of an embodiment, one or more non-transitory computer-readable storage media may be configured to store instructions that, in response to being executed, cause a system to perform operations. The operations may include obtaining sensor data from one or more LiDAR units and determining a point-cloud corresponding to the sensor data obtained from each respective LiDAR unit. The operations may include aggregating the point-clouds as an aggregated point-cloud and generating an initial proposal for a two-dimensional ground model made of multiple grid blocks. The operations may include filtering out unrelated raw data points from each grid block of the plurality of grid blocks to generate a filtered point-cloud matrix. The operations may include identifying one or more surface-points and one or more object-points included in the filtered point-cloud matrix and generating an array of extracted objects based on the object-points.

In some embodiments, the operations may further comprise identifying one or more objects in which each object is associated with one or more of the object-points and generating an array of extracted objects based on the identified objects.

In some embodiments, each of the grid blocks of the initial proposal for the two-dimensional ground model may include a rectangular shape having edge lengths ranging from 0.5 meters to 10 meters. One or more of the grid blocks of the initial proposal for the two-dimensional ground model further away from an autonomous vehicle corresponding to the LiDAR units may include longer edge lengths than one or more of the grid blocks closer to the autonomous vehicle.

In some embodiments, the object-points may be data points included in a given grid block positioned at an elevation higher than a first threshold or lower than a second threshold, where the first threshold and the second threshold are based on other data points included in the given grid block. In these and other embodiments, the surface-points may be data points included in the given grid block that are a remainder of the data points exclusive of the object-points. In these and other embodiments, data points associated with a first change in the elevation for the given grid block that are below a threshold slope may be categorized as surface-points, despite a second change in the elevation across multiple grid blocks being above the threshold slope, the multiple grid blocks including the given grid block.

According to an aspect of an embodiment, a system may include one or more processors and one or more non-transitory computer-readable storage media configured to store instructions that, in response to being executed, cause a system to perform operations. The operations may include obtaining sensor data from one or more LiDAR units and determining a point-cloud corresponding to the sensor data obtained from each respective LiDAR unit. The operations may include aggregating the point-clouds as an aggregated point-cloud and generating an initial proposal for a two-dimensional ground model made of multiple grid blocks. The operations may include filtering out unrelated raw data points from each grid block of the plurality of grid blocks to generate a filtered point-cloud matrix. The operations may include identifying one or more surface-points and one or more object-points included in the filtered point-cloud matrix and generating an array of extracted objects based on the object-points.

In some embodiments, the operations may further comprise identifying one or more objects in which each object is associated with one or more of the object-points and generating an array of extracted objects based on the identified objects.

In some embodiments, each of the grid blocks of the initial proposal for the two-dimensional ground model may include a rectangular shape having edge lengths ranging from 0.5 meters to 10 meters. One or more of the grid blocks of the initial proposal for the two-dimensional ground model further away from an autonomous vehicle corresponding to the LiDAR units may include longer edge lengths than one or more of the grid blocks closer to the autonomous vehicle.

In some embodiments, the object-points may be data points included in a given grid block positioned at an elevation higher than a first threshold or lower than a second threshold, where the first threshold and the second threshold are based on other data points included in the given grid block. In these and other embodiments, the surface-points may be data points included in the given grid block that are a remainder of the data points exclusive of the object-points. In these and other embodiments, data points associated with a first change in the elevation for the given grid block that are below a threshold slope may be categorized as surface-points, despite a second change in the elevation across multiple grid blocks being above the threshold slope, the multiple grid blocks including the given grid block.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

An autonomous driving system may facilitate autonomous operation of an automobile or any other vehicle with limited or no action from a driver or a passenger of the vehicle. Operation of a fully autonomous driving system may entail collecting large amounts of data from an environment surrounding the autonomous driving system such that the autonomous driving system may perform various computations that facilitate the autonomous operation of the vehicle. The autonomous driving system may include a suite of on-vehicle sensors that are involved in collecting information regarding the autonomous vehicle's surroundings with which the autonomous driving system may use to identify objects in the vicinity of the autonomous vehicle. The autonomous driving system may include a mapping system and a localization system that are respectively configured to generate a virtual map and determine a position of the autonomous vehicle with respect to the virtual map based on the collected sensor data. The autonomous driving system may then predict the movement and/or the trajectory of one or more of the detected objects and make driving decisions based on the present location of the autonomous vehicle, an intended destination, the detected positions and predicted trajectories of nearby objects, and one or more driving rules that apply to the autonomous vehicle. The driving decisions may be sent to a control system for the autonomous vehicle, which may affect operation of the autonomous vehicle, such as by a drive-by-wire system in communication with the autonomous vehicle via a drive-by-wire abstraction system.

The present disclosure may relate to removal of data points associated with the ground based on light detection and ranging (LiDAR) data obtained by one or more LiDAR units positioned on and/or around a vehicle. Data points associated with the ground in a given environment may not be as useful and/or relevant as data points associated with objects for navigation of autonomous vehicles. Removal of data points associated with the ground may simplify computations by focusing data analysis processes on relevant data points associated with objects. Thus, the computing speed and efficiency of object-detection systems and/or collision-avoidance systems for autonomous vehicles may be improved.

Embodiments of the present disclosure will be explained with reference to the accompanying drawings.

Figure 1:
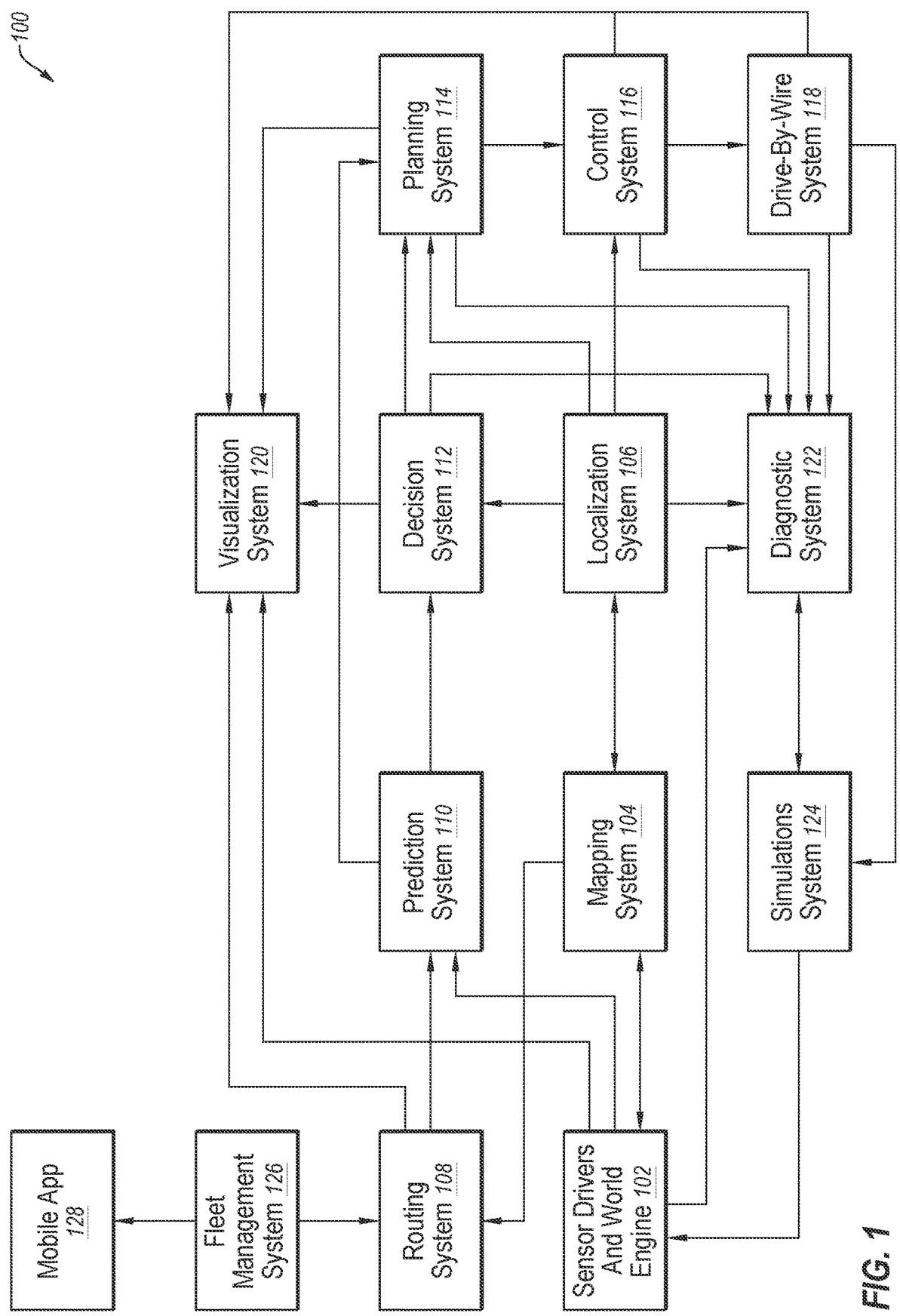
FIG. 1 illustrates an example embodiment of an autonomous driving system according to at least one embodiment of the present disclosure.

FIG. 1 illustrates an example embodiment of an autonomous driving system 100 according to at least one embodiment of the present disclosure. The autonomous driving system 100 may include one or more computer systems and/or software modules configured to perform one or more operations involved with driving an autonomous vehicle. Various aspects of the autonomous driving system 100 may be included on-board with the autonomous vehicle itself, or with a remote system in communication with the autonomous vehicle, such as a cloud computing system, a server, or a mobile device. In some embodiments, the autonomous driving system 100 may include sensor drivers and a world engine 102 that is configured to capture and process sensor data relating to an environment in which the autonomous vehicle travels, such as information relating to what objects are present in the environment and where such objects are located relative to the autonomous vehicle. The sensor data related to the autonomous vehicle's environment may be sent to a mapping system 104 to generate a virtual map of the environment. In some embodiments, the virtual map may be sent from the mapping system 104 back to the sensor drivers and world engine 102 to provide a map on which the sensor data relating to environmental objects may be oriented. Additionally or alternatively, the virtual map may provide a map onto which environmental topography may be plotted.

The virtual map of the mapping system 104 may be sent to a localization system 106 and/or a routing system 108. The localization system 106 may provide an estimated location of the autonomous vehicle within the environment and/or the virtual map, and the routing system 108 may compute a route between the estimated location of the autonomous vehicle to a designated destination along a valid path included in the virtual map.

In some embodiments, the sensor data of the sensor drivers and world engine 102 may be sent to a prediction system 110 that is configured to predict movement and/or trajectories of one or more objects in the vicinity of the autonomous vehicle and/or the autonomous vehicle itself. A decision system 112 may obtain the predicted object trajectories from the prediction system 110, and based on a location of the autonomous vehicle as determined by the localization system 106, the decision system 112 may determine one or more driving decisions according to various driving rules. The driving decisions determined by the decision system 112 may be sent to a planning system 114 that processes, parses, and/or queues the driving decisions for a downstream control system 116. In some embodiments, the control system 116 may generate control signals that are obtained by a drive-by-wire system 118 or another actuation system that controls one or more operations of the autonomous vehicle.

In some embodiments, the autonomous driving system 100 may include a visualization system 120 that is configured to obtain information from the sensor drivers and world engine 102, the prediction system 110, the decision system 112, the planning system 114, the control system 116, the drive-by-wire system 118, or any other computer system of the autonomous driving system 100. The visualization system 120 may generate two-dimensional and/or three-dimensional models of the autonomous vehicle, objects in the vicinity of the autonomous vehicle, and/or the environment in which the autonomous vehicle operates. Additionally or alternatively, the visualization system 120 may provide a visual representation of movement and/or predicted trajectories of the autonomous vehicle and/or any of the nearby objects.

In some embodiments, the autonomous driving system 100 may include a diagnostics system 122 that is configured to obtain information from the sensor drivers and world engine 102, the prediction system 110, the decision system 112, the planning system 114, the control system 116, the drive-by-wire system 118, or any other computer system of the autonomous driving system 100. The diagnostics system 122 may run diagnostic tests to assess the accuracy and/or validity of determinations and decisions made by other computer systems of the autonomous driving system 100.

In these and other embodiments, the diagnostics system 122 may be communicatively coupled to a simulations system 124 that provides a virtual environment in which the determinations and decisions made by other computer systems and/or software modules of the autonomous driving system 100 may be simulated to identify any issues with the simulated determinations and decisions. Additionally or alternatively, the simulations system 124 may obtain information from the drive-by-wire system 118 so that the simulations system 124 may run simulations based on control signals implemented by the autonomous vehicle in the real world. The simulations system 124 may virtually determine movements of the autonomous vehicle and/or of one or more objects in the vicinity of the autonomous vehicle. Based on the virtually determined movements, the simulations system 124 may determine updated positions of the autonomous vehicle and/or of the surrounding objects. In some embodiments, the simulations system 124 may provide the virtually determined movements and/or the updated positions to the sensor drivers and world engine 102 so that the total measurable world as represented by the sensor drivers and world engine 102 may be updated based on the simulation results.

In some embodiments, the autonomous driving system 100 may include a fleet management system 126 that obtains information from multiple autonomous vehicles communicatively coupled to the fleet management system 126. The fleet management system 126 may relay information between different autonomous vehicles in communication with the fleet management system 126 to coordinate operations of the multiple autonomous vehicles. In these and other embodiments, a user managing fleet operations may use a mobile app 128 to receive information from and/or send information or commands to a fleet of autonomous vehicles.

Modifications, additions, or omissions may be made to the autonomous driving system 100 without departing from the scope of the present disclosure. For example, the designations of different elements in the manner described is meant to help explain concepts described herein and is not limiting. For instance, in some embodiments, the graphing module 120 and the quadratic computation module 130 are delineated in the specific manner described to help with explaining concepts described herein but such delineation is not meant to be limiting. Further, the autonomous driving system 100 may include any number of other elements or may be implemented within other systems or contexts than those described.

Figure 2:
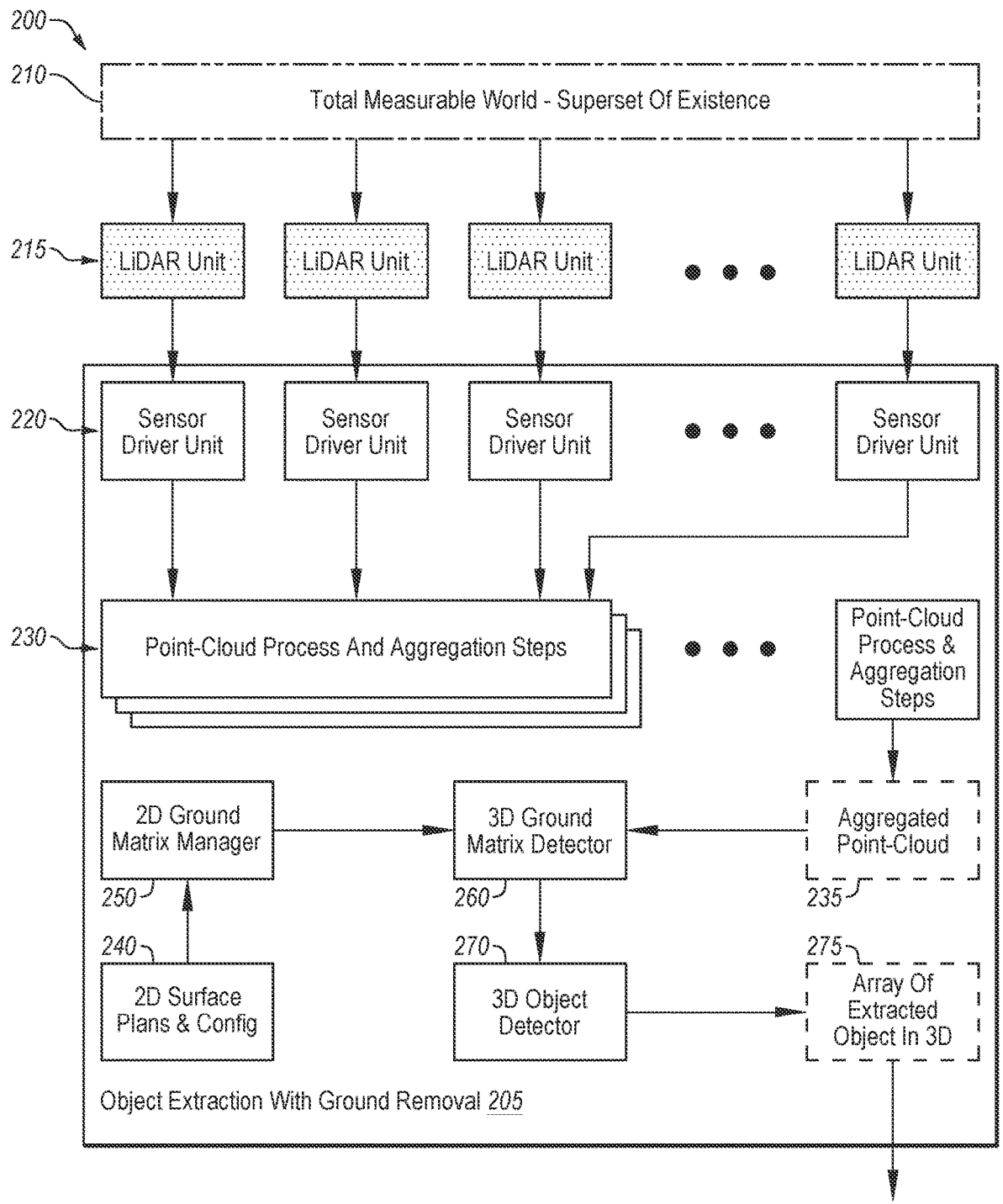
FIG. 2 illustrates an example embodiment of an object-extraction system configured for ground removal according to the present disclosure.

FIG. 2 illustrates an example embodiment of an environment within which an object-extraction system 205 configured for ground removal operates according to one or more embodiments of the present disclosure. The object-extraction system 205 may include sensor driver units 220 that generate point-clouds centered around a corresponding LiDAR unit 215 from which sensor data is obtained. The object-extraction system 205 may include a point-cloud aggregator 230, a two-dimensional surface planner 240, a two-dimensional ground matrix manager 250, a three-dimensional matrix detector 260, and/or a three-dimensional object detector 270. In some embodiments, the LiDAR units 215 may be physical sensor components mounted to an autonomous vehicle (as illustrated in total measurable world 300 in FIG. 3 below) that capture information relating to topography, terrain, objects, or any other aspects of a total measurable world 210 around the autonomous vehicle, while the point-cloud aggregator 230, the two-dimensional surface planner 240, the two-dimensional ground matrix manager 250, the three-dimensional matrix detector 260, and the three-dimensional object detector 270 may be software modules associated with a computer system, such as the object-extraction system 205. In these and other embodiments, an aggregated point-cloud 235 and/or an array of extracted objects 275 may be data input to and/or output from one or more of the software modules described above.

One or more of the LiDAR units 215 may be positioned on a vehicle and configured to capture LiDAR data about the total measurable world 210 in which the total measurable world 210 includes one or more objects within the detection range of the LiDAR units 215. In some embodiments, the LiDAR data may include data points relating to a topography of the total measurable world 210 within the range of the LiDAR units and data points representing objects in the total measurable world 210 based on changes in the topography. For example, sudden increases in the topography, sudden decreases in the topography, and/or combinations thereof may be identified as objects in the total measurable world 210 rather than continuations of the topography. Additionally or alternatively, the LiDAR data may include a distance from the vehicle to each of the detected objects based on measuring the time for reflected light to return to the LiDAR units.

Figure 3:
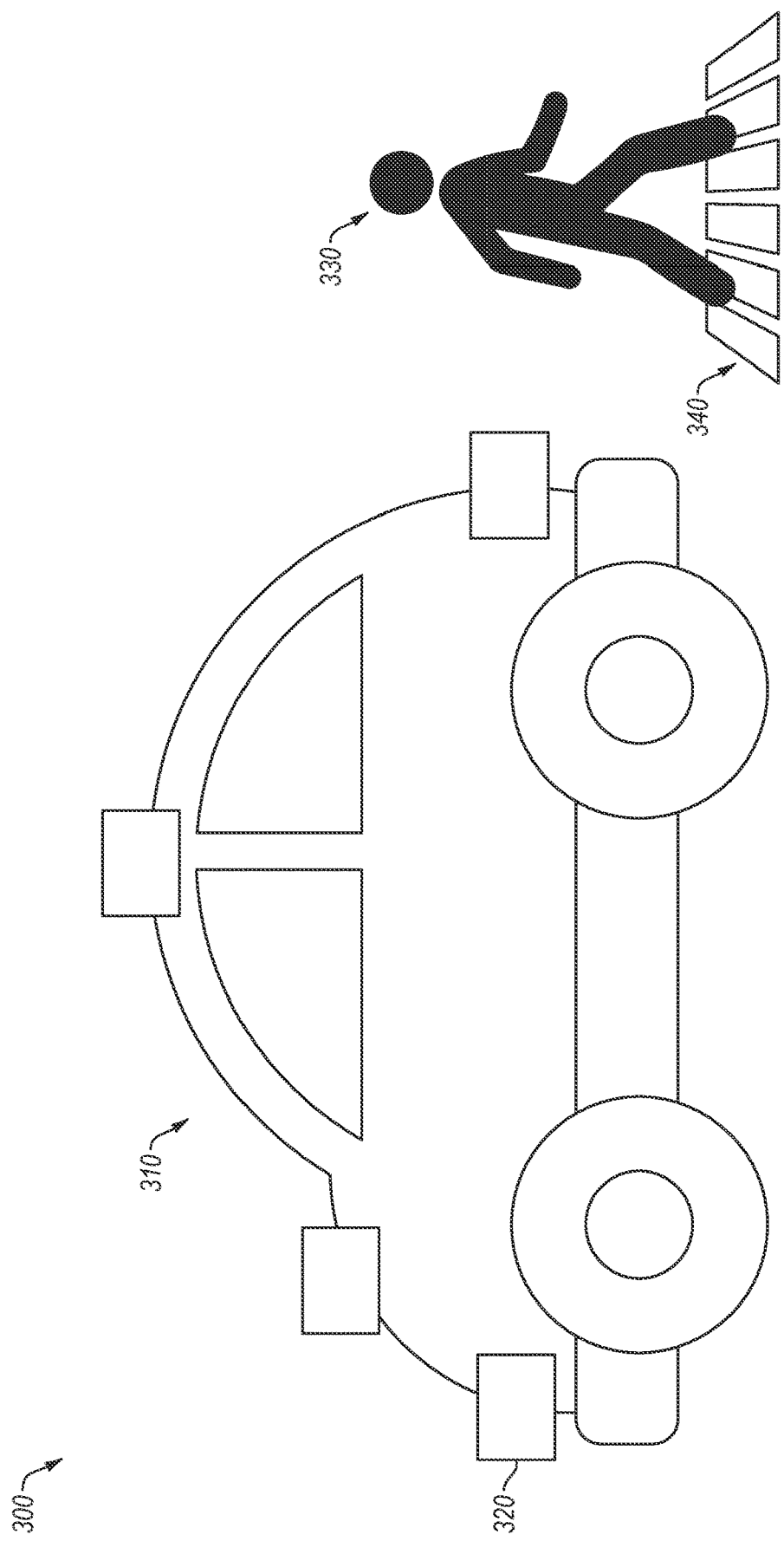
FIG. 3 illustrates an autonomous vehicle with LiDAR sensor units positioned on the autonomous vehicle in which the LiDAR sensor units are configured to capture LiDAR data representative of a total measurable world around the LiDAR sensor units according to at least one embodiment of the present disclosure.

As illustrated in FIG. 3, one or more LiDAR units 320, which may be the same as or similar to the LiDAR units 215 of FIG. 2, may be positioned on an autonomous vehicle 310 and configured to capture LiDAR data that is representative of a total measurable world 300 around the LiDAR units 320 as perceived by the LiDAR units 320. The total measurable world 300 may include one or more objects 330 within the detection range of the LiDAR units 320. In some embodiments, the LiDAR data generated by a given LiDAR unit 320 may include a topography 340 of that portion of the total measurable world 300 that is within the range of the given LiDAR unit 320, and detection of the objects 330 in the total measurable world 300 may be based on changes in the sensed topography 340 as described in further detail below. For example, sudden increases in the topography 340, sudden decreases in the topography 340, unnatural topographical contouring (e.g., very straight edges, orderly polygonal shapes, or repeating topography), and/or some combination thereof may be identified as the objects 330 in the total measurable world 300 as described in further detail below. Additionally or alternatively, the LiDAR data may include a distance from the autonomous vehicle 310 to each of the detected objects 330 or other topographical features based on measuring the time for reflected light to return to the LiDAR units 320. Additionally or alternatively, the LiDAR units 320 may be configured to measure an intensity of reflected light returning to the LiDAR units 320. As used herein, the topography 340 may refer to characteristics of a plane or surface representative of a collection of points of LiDAR data, such as relative elevation changes in the plane or surface, which may correspond to features included in the total measurable world 300, such as a crosswalk or other part of a road as illustrated in FIG. 3.

Returning to the description of FIG. 2, the LiDAR data captured by a given LiDAR unit 215 may be represented as unit-centered point-clouds by a respective sensor driver unit 220 corresponding to the given LiDAR unit 215. Each unit-centered point-cloud may include a matrix of three-dimensional points that represent the LiDAR data captured by each of the LiDAR units 215. For example, each of the unit-centered point-clouds may include three-dimensional points captured within the detection range of corresponding LiDAR units 215 and one or more three-dimensional points within the unit-centered point-clouds may correspond to objects detected by the LiDAR units 215.

Because each of the LiDAR units 215 may be positioned and/or oriented independently of each other LiDAR unit 215, the unit-centered point-clouds corresponding to each of the LiDAR units 215 may be misaligned relative to one another. Additionally or alternatively, the unit-centered point-cloud captured by a given LiDAR unit 215 may only represent a subset of the total measurable world 210. In some embodiments, the unit-centered point-clouds may be aggregated by the point-cloud aggregator 230 to generate the aggregated set of point-clouds 235 that is representative of the total measurable world 210 within the detection range of the LiDAR units 215. In some embodiments, the aggregated point-cloud 235 may be represented by a three-dimensional matrix describing the three-dimensional position of scanned points captured by the LiDAR units (e.g., position along an x-axis, a y-axis, and/or a z-axis). Additionally or alternatively, the aggregated point-cloud 235 may be represented by a four-dimensional matrix that describes the three-dimensional position of scanned points captured by the LiDAR units and an intensity of reflected light captured at each of the three-dimensional positions.

In some embodiments, the reflection intensity associated with each of the scanned points may be represented as a fourth element alongside x-position, y-position, and z-position information corresponding to each scanned point. For example, the matrix may be represented mathematically as follows:

$$\begin{bmatrix} 5 & 4 & 23 & I_1 \\ \vdots & \ddots & \ddots & \vdots \\ 19 & -4 & 12 & I_n \end{bmatrix}$$

In the example matrix, each row of the matrix may represent one of the scanned points. Each row of the matrix may include a first value (e.g., in the first column of each row) indicating the x-position of the corresponding scanned point, a second value (e.g., in the second column of each row) indicating the y-position of the corresponding scanned point, a third value (e.g., in the third column of each row) indicating the z-position of the corresponding scanned point. Additionally or alternatively, each row of the example matrix may include a fourth value, such as intensity values $I_1, \ldots,$ and/or $I_n$ in the fourth column of each row that corresponds to an intensity of reflected light corresponding to respective scanned points.

In some embodiments, the point-cloud aggregator 230 may apply one or more matrix transformations to the unit-centered point-clouds in which the matrix transformations adjust the alignment of one or more of the unit-centered point-clouds based on a configurable transformation (TF)-tree structure of transformation. The TF-tree structure of transformation may involve setting a center point at some location near, on, and/or in the autonomous vehicle and one or more intermediate points near, on, and/or in the autonomous vehicle. Each of the unit-centered point-clouds may be paired with one of the intermediate points, and a matrix transformation may be applied to the unit-centered point-clouds to move and/or orient the unit-centered point-clouds to their paired intermediate points. In some embodiments, the matrix transformations may include scaling (e.g., multiplying one or more elements of the matrices representing the unit-centered point-clouds by a given value, adding, and/or subtracting elements of the matrices by a given value, or some combination thereof) and/or rotating the unit-centered point-clouds based on the location and orientation of the unit-centered point-clouds relative to their paired intermediate points. After moving and/or orienting the unit-centered point-clouds to their paired intermediate points, a second matrix transformation may be applied to each of the intermediate points to move and/or reorient the matrices at the intermediate points to the center point of the autonomous vehicle.

Using the TF-tree structure of transformation may provide numerous advantages over directly transforming each of the unit-centered point-clouds to the center point of the autonomous vehicle. For example, applying matrix transformations via the TF-tree structure of transformation may preserve data precision during movement and/or reorientation of the unit-centered point-clouds better than directly transforming each of the unit-centered point-clouds to the center point because rounding issues may be avoided. As another example, computational speed may be increased and/or resource usage may be decreased because the computations being applied to the unit-centered point-clouds via the TF-tree structure of transformation may be simpler than matrix transformations specifically tailored to each unit-centered point-cloud for transforming to the center point. As another example, introducing new sensors to the autonomous vehicle may be easier under the TF-tree structure of transformation because a simple matrix transformation may be applied to the new sensors based on the intermediate points to which the new sensors are paired.

Additionally or alternatively, adjusting the alignment of the unit-centered point-clouds may include changing one or more parameters of the centers and/or origins of the unit-centered point-clouds within six degrees of freedom including at least one of: surge, heave, and/or sway for three-dimensional translation and/or pitch, yaw, and/or roll for three-dimensional orientation. In some embodiments, the transformation may account for differences between an origin position of the system to analyze the total measurable world 210 and a location of the corresponding LiDAR unit 215. For example, a middle of a rear axle of an autonomous vehicle may be treated as the origin position while the LiDAR units 215 may be positioned at locations different from the middle of the rear axle. The matrix transformations may adjust the LiDAR data to originate from a common point of reference (i.e., the origin position). In these and other embodiments, a transformation manager may include a data storage of the matrix transformations appliable to the LiDAR data by the point-cloud aggregator 230 (e.g., a different matrix transformation for each of the different LiDAR units 215). The point-cloud aggregator 230 may obtain one or more of the matrix transformations from the transformation manager and apply the obtained matrix transformations to aggregate the unit-centered point-clouds.

Figure 4:
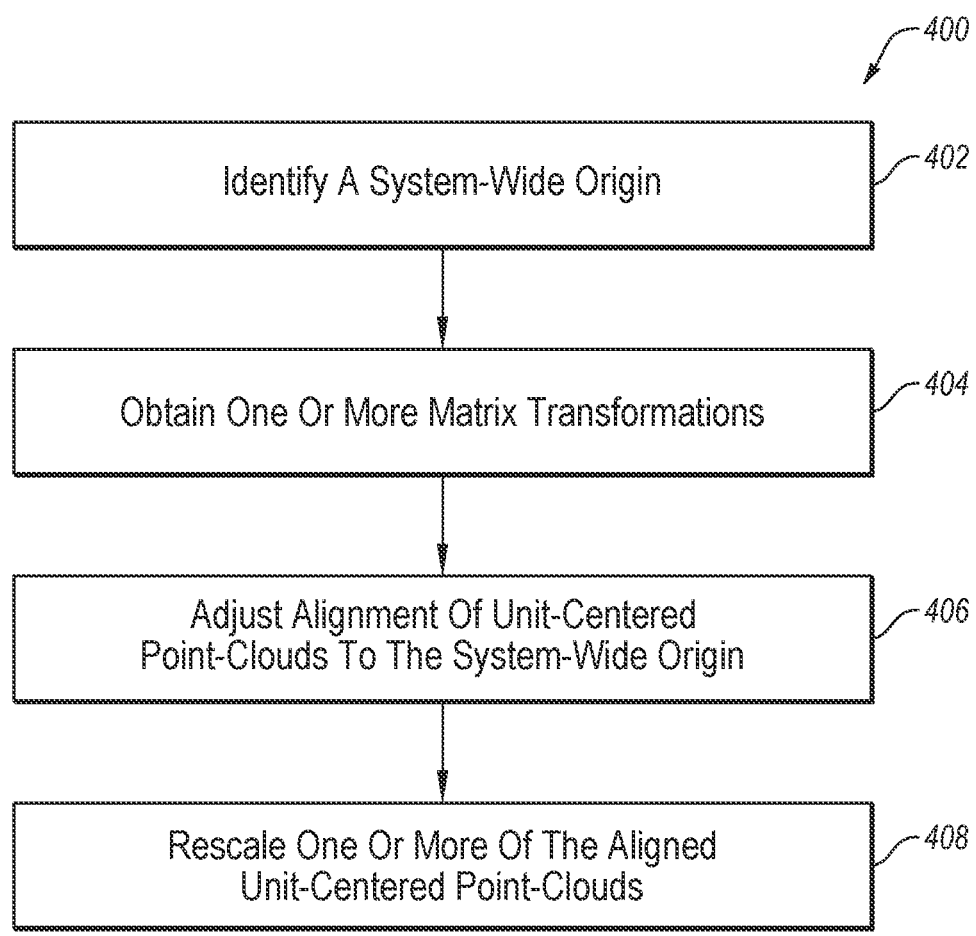
FIG. 4 is a flowchart of an example method of aligning multiple unit-centered point-clouds and generating an aggregated point-cloud according to at least one embodiment of the present disclosure.

FIG. 4 is a flowchart of an example method 400 of aligning multiple unit-centered point-clouds and generating an aggregated point-cloud, such as the aggregated point-cloud 235, according to at least one embodiment of the present disclosure. The method 400 may be performed by any suitable system, apparatus, or device. For example, the object-extraction system 205, the sensor driver units 220, the point-cloud aggregator 230, the two-dimensional surface planner 240, the two-dimensional ground matrix manager 250, the three-dimensional ground matrix detector 260, and/or the three-dimensional object detector 270 of FIG. 2 may perform one or more operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may begin at block 402, where a system-wide origin is identified. In some embodiments, the system-wide origin may be a point located on and/or in an autonomous vehicle on which LiDAR sensors are mounted. The LiDAR data captured by the LiDAR sensors may be used to represent surroundings of the autonomous vehicle on which the LiDAR sensors are mounted. For example, the system-wide origin may be a center of mass of the autonomous vehicle, a driver's seat position in the autonomous vehicle, the middle of the rear axle, or some other point on, in, or near the autonomous vehicle.

At block 404, one or more matrix transformations may be obtained. The matrix transformations may include matrix computation templates that may be applied to a given matrix that represents a unit-centered point-cloud. The matrix computations templates may facilitate translating the given matrix to a different position based on a center point (e.g., the system-wide origin), rotating the given matrix, rescaling the given matrix, or any other adjustments to the given matrix.

At block 406, alignment of one or more unit-centered point-clouds may be adjusted based on the system-wide origin. In some embodiments, one or more of the matrix transformations obtained at block 404 may applied to a given unit-centered point-cloud such that data points associated with the given unit-centered point-cloud are changed to represent a shift of the unit-centered point-cloud to the system-wide origin. In other words, the given unit-centered point-cloud, which may initially represent LiDAR data scanned from an origin point associated with a given LiDAR sensor, may be recentered and/or rotated to correspond with the system-wide origin.

At block 408, one or more of the aligned point-clouds may be rescaled. Because translating and/or rotating a given unit-centered point-cloud may change how some data points associated with the given unit-centered point-cloud are interpreted, the aligned point-clouds may be rescaled to fix any such issues caused by application of the matrix transformations to the given unit-centered point-cloud.

Modifications, additions, or omissions may be made to the method 400 without departing from the scope of the disclosure. For example, the designations of different elements in the manner described is meant to help explain concepts described herein and is not limiting. Further, the method 400 may include any number of other elements or may be implemented within other systems or contexts than those described.

Returning to the description of FIG. 2, in some embodiments, the two-dimensional ground matrix manager 250 may obtain an initial proposal for a two-dimensional ground model (e.g., model of the ground) from the two-dimensional surface planner 240. Generating the initial proposal for the two-dimensional ground model may include plane-fitting a top-down view of a ground layout that corresponds to the aggregated point-cloud 235 at a specified resolution level. The plane-fitting of the ground layout may include partitioning the top-down view of the ground layout into multiple two-dimensional shapes such as triangles, squares, rectangles, hexagons, etc. ("grid blocks") arranged in a grid in which the outer bounds of the grid correspond to the outer bounds of the ground layout. In some embodiments, each of the grid blocks may include edges having lengths ranging from around 0.5 meters to 10 meters in which the resolution of the grid increases as the length of the grid blocks decreases. The computational resources used for plane-fitting may increase as the resolution of the grid blocks increases, while the computational resources used for plane-fitting may decrease as the resolution of the grid blocks decreases.

In these and other embodiments, the plane-fitting may include performing a topographical analysis of the grid blocks to determine whether one or more objects are included in the area encompassed by each of the respective grid blocks. In some embodiments, unexpected changes in the topography of a given grid block may indicate the presence of one or more objects. For example, a sudden increase and/or a sudden decrease in topographical elevation (e.g., a topographical elevation change occurring over a sufficiently short distance) in the given grid block may indicate an object exists in the given grid block.

Figure 5:
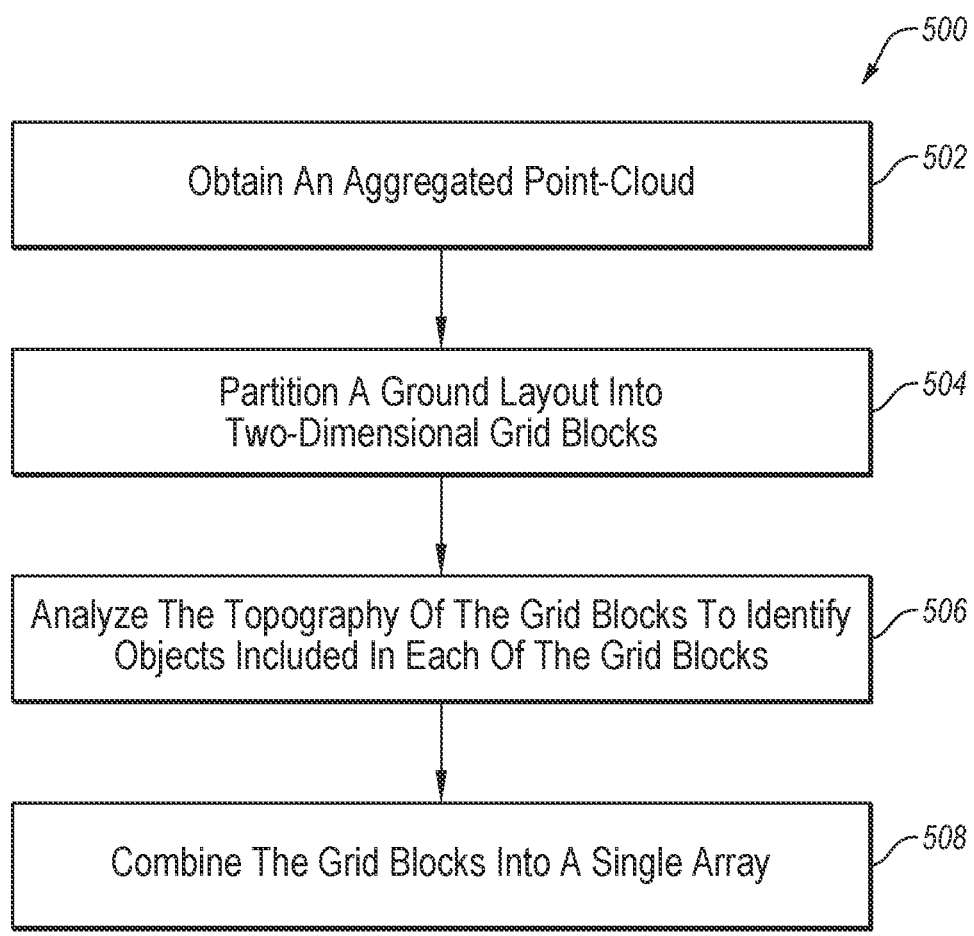
FIG. 5 is a flowchart of an example method of generating the initial proposal for the two-dimensional ground model according to at least one embodiment of the present disclosure.

FIG. 5 is a flowchart of an example method 500 of generating the initial proposal for the two-dimensional ground model according to at least one embodiment of the present disclosure. The method 500 may be performed by any suitable system, apparatus, or device. For example, the object-extraction system 205, the sensor driver units 220, the point-cloud aggregator 230, the two-dimensional surface planner 240, the two-dimensional ground matrix manager 250, the three-dimensional ground matrix detector 260, and/or the three-dimensional object detector 270 of FIG. 2 may perform one or more operations associated with the method 500. Although illustrated with discrete blocks, the steps and operations associated with one or more of the blocks of the method 500 may be divided into additional blocks, combined into fewer blocks, or eliminated, depending on the particular implementation.

The method 500 may begin at block 502, where an aggregated point-cloud may be obtained. The aggregated point-cloud may be a point-cloud that includes information relating to multiple different scanned points captured by LiDAR sensor units as described above in relation to the aggregated point-cloud 235 of FIG. 2.

At block 504, a top-down view of a ground layout may be plane-fitted over the aggregated point-cloud, and the ground layout may be partitioned into multiple two-dimensional grid blocks. In some embodiments, the two-dimensional grid blocks may be triangles, squares, rectangles, hexagons, convex hulls, concave hulls, or any other shapes that may be positioned adjacent to one another in a repeating pattern. A resolution of the ground layout may be set based on a size of the two-dimensional grid blocks into which the ground layout is partitioned. For example, partitioning the ground layout into larger two-dimensional grid blocks may result in a lower resolution because each grid block is larger, and further analysis at a grid-block level may result in less detailed information. As an additional or alternative example, partitioning the ground layout into smaller two-dimensional grid blocks may result in higher resolution because further analysis of each grid block may capture more minute details regarding a topography of the ground layout and/or objects included in the grid blocks.

In these and other embodiments, the resolution of the ground layout may be set at a higher resolution or at a lower resolution based on an environment in which the ground layout is being applied and/or a processing power of a computer system implementing and using the ground layout. Higher resolutions may provide more minute details regarding a given ground layout such that the computer system may be provided with a more comprehensive ground layout, while lower resolutions may be processed by the computer system more efficiently and/or quickly. Determining whether to set a higher or a lower resolution for the ground layout may depend on the application in which the ground layout will be used. For example, busy urban settings with multiple different objects, pedestrians, and/or other vehicles may need higher resolution ground layouts to avoid erroneous ground and/or object extractions, while sparsely populated country roads with few changes in the terrain may be processed and used at lower resolutions without error.

At block 506, the topography of the grid blocks may be analyzed to identify objects included in each of the grid blocks. In some embodiments, analyzing the topography of a given grid block may involve identifying unexpected changes in the topography of the given grid block. Unexpected changes in the topography may include increases and/or decreases in topographical elevation that occur over a sufficiently short distance. Such changes in the topography may indicate that an object is present because it is unlikely that the topography included in the given grid block naturally changes in the observed manner, and the sudden change in topographical elevation is more likely to be attributed to an object included in the given grid block. For example, a sharp increase in topographical elevation (i.e., a high change in topographical elevation over a short distance) may indicate that a lamppost, a traffic sign, a building wall, a fire hydrant, a tree, another vehicle, a pedestrian, or any other object above a topographical ground level has been detected. As another example, a sharp decrease in topographical elevation may indicate that a ditch or any of the aforementioned objects has been detected. Additionally or alternatively, the partitioned grid blocks may be fed to a user and/or a machine-learning system so that different shapes included in the topography of the partitioned grid blocks may be identified as one or more objects.

At block 508, the objects for a given grid block may be aggregated, and/or objects across multiple grid blocks (such as those within a threshold distance from the autonomous vehicle) may be combined into a single array. In some embodiments, the single array may include a representation of the ground layout including identified objects within a threshold distance of the autonomous vehicle, which may be sent to downstream computer systems configured to control operations of the autonomous vehicle based on the identities of the objects and the locations of the objects relative to the autonomous vehicle.

Modifications, additions, or omissions may be made to the method 500 without departing from the scope of the disclosure. For example, the designations of different elements in the manner described is meant to help explain concepts described herein and is not limiting. Further, the method 500 may include any number of other elements or may be implemented within other systems or contexts than those described.

Returning to the description of FIG. 2, in some embodiments, the two-dimensional ground manager 250 may filter out raw data points unrelated to the initial proposal for the two-dimensional ground model. One or more of the raw data points may be considered unrelated because the unrelated raw data points are irrelevant to object detection (e.g., data points associated with the vehicle from which the LiDAR data was captured) and/or appear trivial for object detection (e.g., data points at sufficiently high and/or low elevations such that a vehicle would be unaffected by the data points). Additionally or alternatively, the process of filtering out unrelated raw data points may be omitted if the data associated with the two-dimensional ground model is collected by well-calibrated and/or high-quality LiDAR units.

The three-dimensional ground matrix detector 260 may obtain the matrix of point-clouds from the two-dimensional ground matrix manager 250 and apply a ground-removal procedure on the matrix of point-clouds. In some embodiments, the ground-removal procedure may include categorizing the data points included in the matrix as surface-points or as object-points. To categorize the data points, the three-dimensional ground matrix detector 260 may analyze a surface cell in the matrix of point-clouds and flag one or more data points including an elevation higher than and/or lower than the surface cell as object-points. In these and other embodiments, the data points that are not flagged as object-points may be categorized as surface-points.

In some embodiments, by using the individual grid blocks to facilitate the ground detection and removal, gradual variations or slopes in the ground may be accounted for as still being part of the ground without classifying the variation as an object. For example, if the change in height due to slope across three consecutive grid blocks may be outside a threshold level to trigger an object, because it is spread across three elements, each distinct element is recognized as ground, even though there may be minor variations in the surface of the ground. By more accurately detecting each grid block or portion thereof as ground, which can be removed from processing, the object detection and other data processing may operate more efficiently.

The object-points may be extracted from the matrix of point-clouds and obtained by the three-dimensional object detector 270. The three-dimensional object detector 270 may apply an object-detection process to the extracted object-points to generate an array of extracted objects 275. In some embodiments, the object-detection process may analyze the extracted object-points to identify groups of the extracted object-points that may represent one or more objects, such as pedestrians, other vehicles, construction work barriers, lane barriers, traffic signage, nearby vegetation, or any other objects in the vicinity of the autonomous vehicle. The intensity values and/or changes in the intensity values in combination with the x-positions, the y-positions, and/or the z-positions associated with the object-points may facilitate identifying materials and/or profiles of one or more of the objects. For example, a group of object-points that include an approximately octangular shape and includes intensity values corresponding to the light reflectivity of metal surfaces may be associated with a stop sign. In these and other embodiments, the object-detection process may include applying an image-recognition algorithm and/or a machine-learning model configured to perform image recognition on the object-points.

Modifications, additions, or omissions may be made to the object-detection system without departing from the scope of the present disclosure. For example, the designations of different elements in the manner described is meant to help explain concepts described herein and is not limiting. For instance, in some embodiments, the sensor driver units 220, the point-cloud aggregator 230, the two-dimensional surface planner 240, the two-dimensional ground matrix manager 250, the three-dimensional ground matrix detector 260, and/or the three-dimensional object detector 270 are delineated in the specific manner described to help with explaining concepts described herein but such delineation is not meant to be limiting. Further, the object-detection system may include any number of other elements or may be implemented within other systems or contexts than those described.

Figure 6:
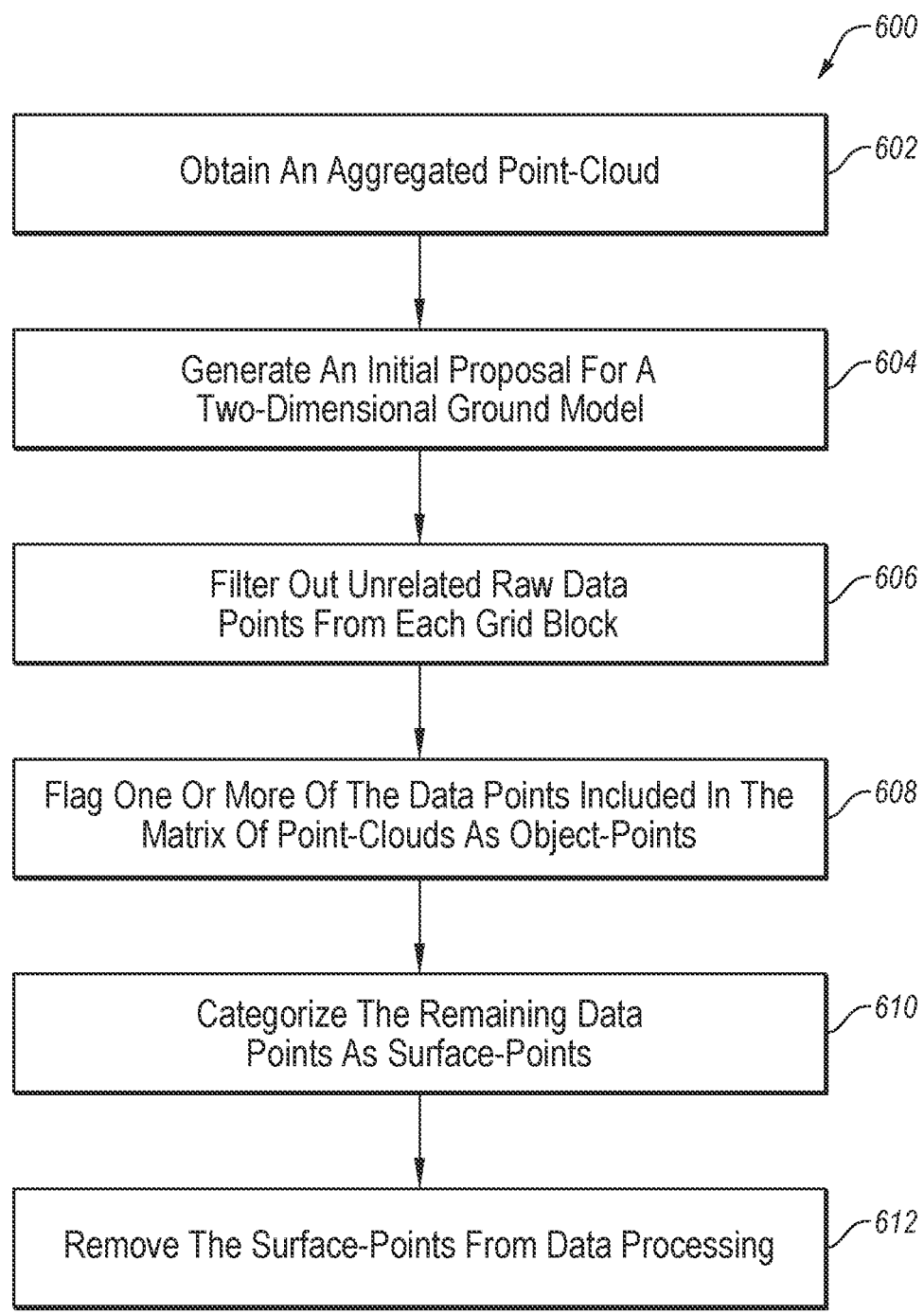
FIG. 6 is a flowchart of an example method of applying ground removal to an object-extraction system according to at least one embodiment of the present disclosure.

FIG. 6 is a flowchart of an example method 600 of performing the ground-removal procedure on the matrix of point-clouds included in an object-extraction system according to the present disclosure. The method 600 may be performed by any suitable system, apparatus, or device. For example, the sensor driver units 220, the point-cloud aggregator 230, the two-dimensional surface planner 240, the two-dimensional ground matrix manager 250, the three-dimensional ground matrix detector 260, and/or the three-dimensional object detector 270 may perform one or more operations associated with the method 600. Although illustrated with discrete blocks, the steps and operations associated with one or more of the blocks of the method 600 may be divided into additional blocks, combined into fewer blocks, or eliminated, depending on the particular implementation.

In some embodiments, the method 600 may be a continuation of the method 500 or may use the product or output of the method 500, such as the aggregated matrix of point-clouds, in performing the method 600.

The method 600 may begin at block 602, where an aggregated point-cloud may be obtained. The aggregated point-cloud may be a point-cloud that includes information relating to multiple different scanned points captured by LiDAR sensor units as described above in relation to the aggregated point-cloud 235 of FIG. 2.

At block 604, an initial proposal for a two-dimensional ground model may be generated. The initial proposal for the two-dimensional ground model may be a two-dimensional grid composed of multiple adjacent grid blocks overlaid on a top-down map of the aggregated point-cloud. A resolution of the grid blocks may be set according to a size of each of the grid blocks with grid blocks having larger sizes resulting in lower resolutions and grid blocks having smaller sizes resulting in higher resolutions. In some embodiments, the initial proposal for the two-dimensional ground model may be generated using the method 400 as described in relation to FIG. 4.

At block 606, unrelated raw data points may be filtered out or otherwise removed from data processing from each grid block to generate a filtered point-cloud matrix. A given data point of the two-dimensional ground model may be considered unrelated if the given data point is irrelevant or trivial to object detection in some way. For example, the given data point may be associated with the autonomous vehicle itself (e.g., part of the vehicle's hood, rear-view mirror, trunk, or any other part of the autonomous vehicle). As another example, data points captured at elevations (e.g., z-coordinates) significantly above and/or below the autonomous vehicle, such as data points corresponding to birds flying in the sky and/or vehicles passing beneath an overpass on which the autonomous vehicle is driving, may be filtered out because such data points may be considered irrelevant to operations of the autonomous vehicle.

At block 608, one or more of the data points included in the filtered matrix of point-clouds may be flagged as object-points. In some embodiments, flagging of the data points as object-points may be based on changes in elevation between the data points. For example, a group of data points may generally be at the same or similar elevation, which may indicate that the group of data points are mostly or all part of a ground surface near the autonomous vehicle. In this and other examples, data points at a higher elevation than but close in proximity to the data points included in the group of data points may be flagged as object-points because the higher elevation data points are likely to correspond to objects included in the vicinity of the autonomous vehicle.

At block 610, the remaining data points may be categorized as surface-points. The surface-points may include the remainder of the data points exclusive of the data points flagged as object-points at block 608. The surface-points may represent the set of data points that are presumed to be part of the ground.

At block 612, the surface-points may be removed from future object-detection operations. After removal of the surface-points, the remaining object-points may be sent to one or more downstream data processing systems such that the object-points may be considered for object detection, vehicle localization, vehicle routing, vehicle and/or object trajectory prediction, driving decision-making, or any other operations associated with the autonomous vehicle. By decreasing the number of data points being processed by the downstream computer systems, the efficiency and/or computational speed associated with such operations may be improved.

Modifications, additions, or omissions may be made to the method 600 without departing from the scope of the disclosure. For example, the designations of different elements in the manner described is meant to help explain concepts described herein and is not limiting. Further, the method 600 may include any number of other elements or may be implemented within other systems or contexts than those described.

Figure 7:
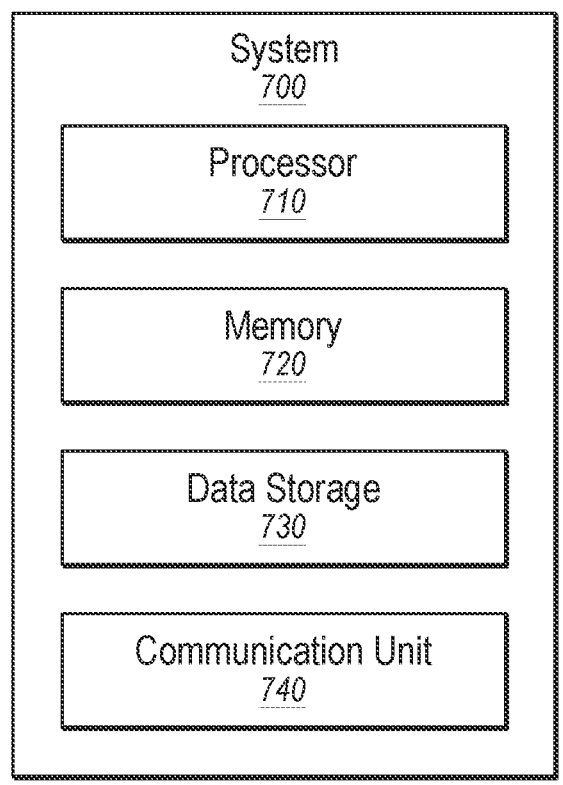
FIG. 7 is an example computing system.

FIG. 7 illustrates an example computing system 700, according to at least one embodiment described in the present disclosure. The computing system 700 may include a processor 710, a memory 720, a data storage 730, and/or a communication unit 740, which all may be communicatively coupled. Any or all of the object-extraction system 200 of FIG. 2 may be implemented as a computing system consistent with the computing system 700, including the sensor driver units 220, the point-cloud aggregator 230, the two-dimensional surface planner 240, the two-dimensional ground matrix manager 250, the three-dimensional ground matrix detector 260, and/or the three-dimensional object detector 270.

Generally, the processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 7, it is understood that the processor 710 may include any number of processors distributed across any number of network or physical locations that are configured to perform individually or collectively any number of operations described in the present disclosure. In some embodiments, the processor 710 may interpret and/or execute program instructions and/or process data stored in the memory 720, the data storage 730, or the memory 720 and the data storage 730. In some embodiments, the processor 710 may fetch program instructions from the data storage 730 and load the program instructions into the memory 720.

After the program instructions are loaded into the memory 720, the processor 710 may execute the program instructions, such as instructions to perform operations associated with the sensor driver units 220, the point-cloud aggregator 230, the two-dimensional surface planner 240, the two-dimensional ground matrix manager 250, the three-dimensional ground matrix detector 260, and/or the three-dimensional object detector 270. Additionally or alternatively, the processor 710 may be execute program instructions to perform operations associated with method 400, method 500, and/or method 600 of FIGS. 4, 5, and/or 6, respectively.

The memory 720 and the data storage 730 may include computer-readable storage media or one or more computer-readable storage mediums for having computer-executable instructions or data structures stored thereon. Such computer-readable storage media may be any available media that may be accessed by a general-purpose or special-purpose computer, such as the processor 710. For example, the memory 720 and/or the data storage 730 may store obtained LiDAR sensor data, the aggregated point-clouds 235, surface-points, object-points, and/or the array of extracted objects 275. In some embodiments, the computing system 700 may or may not include either of the memory 720 and the data storage 730.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 740 may include any component, device, system, or combination thereof that is configured to transmit or receive information over a network. In some embodiments, the communication unit 740 may communicate with other devices at other locations, the same location, or even other components within the same system. For example, the communication unit 740 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 740 may permit data to be exchanged with a network and/or any other devices or systems described in the present disclosure. For example, the communication unit 740 may allow the system 700 to communicate with other systems, such as computing devices and/or other networks.

One skilled in the art, after reviewing this disclosure, may recognize that modifications, additions, or omissions may be made to the system 700 without departing from the scope of the present disclosure. For example, the system 700 may include more or fewer components than those explicitly illustrated and described.

The embodiments described in the present disclosure may include the use of a special purpose or general-purpose computer including various computer hardware or software modules. Further, embodiments described in the present disclosure may be implemented using computer-readable media for having computer-executable instructions or data structures stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method performed by one or more processors, the method comprising:
   obtaining an aggregated point-cloud based on sensor data from one or more LiDAR units;
   generating an initial proposal for a two-dimensional ground model including a plurality of grid blocks;
   filtering out unrelated raw data points from each grid block of the plurality of grid blocks to generate a filtered point-cloud matrix, the unrelated raw data points including at least one of data points that are above a first threshold height, data points that are below a second threshold height, or data points that are part of an autonomous vehicle to which the LiDAR units are coupled;
   identifying one or more surface-points and one or more object-points included in the filtered point-cloud matrix;
   removing the surface-points from consideration in an object detection operation; and
   performing the object detection operation to facilitate operating an autonomous vehicle.

2. The method of claim 1, further comprising:
   identifying one or more objects in which each object is associated with one or more of the object-points; and
   generating an array of extracted objects based on the identified objects.

3. The method of claim 1, wherein each of the grid blocks of the initial proposal for the two-dimensional ground model includes a rectangular shape having edge lengths ranging from 0.5 meters to 10 meters.

4. The method of claim 3, wherein one or more of the grid blocks of the initial proposal for the two-dimensional ground model further away from an autonomous vehicle corresponding to the LiDAR units include longer edge lengths than one or more of the grid blocks closer to the autonomous vehicle.

5. The method of claim 1, wherein the object-points are data points included in a given grid block positioned at an elevation higher than a first threshold or lower than a second threshold, where the first threshold and the second threshold are based on other data points included in the given grid block.

6. The method of claim 5, wherein the surface-points are data points included in the given grid block that are a remainder of the data points exclusive of the object-points.

7. The method of claim 5, wherein data points associated with a first change in the elevation for the given grid block that are below a threshold slope are categorized as surface-points, despite a second change in the elevation across multiple grid blocks being above the threshold slope, the multiple grid blocks including the given grid block.

8. One or more non-transitory computer-readable storage media configured to store instructions that, in response to being executed, cause a system to perform operations, the operations comprising:
   obtaining an aggregated point-cloud based on sensor data from one or more LiDAR units;
   generating an initial proposal for a two-dimensional ground model including a plurality of grid blocks;
   filtering out unrelated raw data points from each grid block of the plurality of grid blocks to generate a filtered point-cloud matrix, the unrelated raw data points including at least one of data points that are above a first threshold height, data points that are below a second threshold height, or data points that are part of an autonomous vehicle to which the LiDAR units are coupled;
   identifying one or more surface-points and one or more object-points included in the filtered point-cloud matrix;
   removing the surface-points from consideration in an object detection operation; and
   performing the object detection operation to facilitate operating an autonomous vehicle.

9. The one or more non-transitory computer-readable storage media of claim 8, further comprising:
   identifying one or more objects in which each object is associated with one or more of the object-points; and generating an array of extracted objects based on the identified objects.

10. The one or more non-transitory computer-readable storage media of claim 8, wherein:
each of the grid blocks of the initial proposal for the two-dimensional ground model includes a rectangular shape having edge lengths ranging from 0.5 meters to 10 meters; and
one or more of the grid blocks of the initial proposal for the two-dimensional ground model further away from an autonomous vehicle corresponding to the LiDAR units include longer edge lengths than one or more of the grid blocks closer to the autonomous vehicle.

11. The one or more non-transitory computer-readable storage media of claim 8, wherein the object-points are data points included in a given grid block positioned at an elevation higher than a first threshold or lower than a second threshold, where the first threshold and the second threshold are based on other data points included in the given grid block.

12. The one or more non-transitory computer-readable storage media of claim 11, wherein the surface-points are data points included in the given grid block that are a remainder of the data points exclusive of the object-points.

13. The one or more non-transitory computer-readable storage media of claim 11, wherein data points associated with a first change in the elevation for the given grid block that are below a threshold slope are categorized as surface-points, despite a second change in the elevation across multiple grid blocks being above the threshold slope, the multiple grid blocks including the given grid block.

14. A system, comprising:
one or more processors; and
one or more non-transitory computer-readable storage media configured to store instructions that, in response to being executed, cause the system to perform operations, the operations comprising:
obtaining an aggregated point-cloud based on sensor data from one or more LiDAR units;
generating an initial proposal for a two-dimensional ground model including a plurality of grid blocks;
filtering out unrelated raw data points from each grid block of the plurality of grid blocks to generate a filtered point-cloud matrix, the unrelated raw data points including at least one of data points that are above a first threshold height, data points that are below a second threshold height, or data points that are part of an autonomous vehicle to which the LiDAR units are coupled;
identifying one or more surface-points and one or more object-points included in the filtered point-cloud matrix;
removing the surface-points from consideration in an object detection operation; and
performing the object detection operation to facilitate operating an autonomous vehicle.

15. The system of claim 14, further comprising:
identifying one or more objects in which each object is associated with one or more of the object-points; and
generating an array of extracted objects based on the identified objects.

16. The system of claim 14, wherein:
each of the grid blocks of the initial proposal for the two-dimensional ground model includes a rectangular shape having edge lengths ranging from 0.5 meters to 10 meters; and
one or more of the grid blocks of the initial proposal for the two-dimensional ground model further away from an autonomous vehicle corresponding to the LiDAR units include longer edge lengths than one or more of the grid blocks closer to the autonomous vehicle.

17. The system of claim 14, wherein the object-points are data points included in a given grid block positioned at an elevation higher than a first threshold or lower than a second threshold, where the first threshold and the second threshold are based on other data points included in the given grid block.

18. The system of claim 17, wherein the surface-points are data points included in the given grid block that are a remainder of the data points exclusive of the object-points.

19. The system of claim 17, wherein data points associated with a first change in the elevation for the given grid block that are below a threshold slope are categorized as surface-points, despite a second change in the elevation across multiple grid blocks being above the threshold slope, the multiple grid blocks including the given grid block.

* * * * *